(12) United States Patent
Kim et al.

(10) Patent No.: US 6,175,396 B1
(45) Date of Patent: Jan. 16, 2001

(54) LIQUID CRYSTAL DISPLAY MODULE

(75) Inventors: Hee-sun Kim, Kyonggi-do; Young-jae Lee, Seoul; Swang-hwan Lee, Kyonggi-do; Tae-gil Kang, Kyonggi-do; Swang-hee Lee, Kyonggi-do; Won-ju Kim, Kyonggi-do, all of (KR)

(73) Assignee: Samsung Electronics Co., Ltd. (KR)

( * ) Notice: Under 35 U.S.C. 154(b), the term of this patent shall be extended for 0 days.

(21) Appl. No.: 09/235,575

(22) Filed: Jan. 22, 1999

Related U.S. Application Data

(60) Provisional application No. 60/073,061, filed on Jan. 29, 1998.

(30) Foreign Application Priority Data

Jan. 24, 1998 (KR) .................................................... 98/2224

(51) Int. Cl.$^7$ ........................ G02F 1/1333; G02F 1/1335; G06K 1/16
(52) U.S. Cl. ................................ 349/58; 349/61; 349/65; 361/681
(58) Field of Search ................................... 349/58, 61, 65; 361/681

(56) References Cited

U.S. PATENT DOCUMENTS

| | | | |
|---|---|---|---|
| 4,614,406 | * | 9/1986 | Motoi ..................................... 350/334 |
| 6,068,381 | * | 5/2000 | Ayres ....................................... 362/31 |
| 6,091,474 | * | 7/2000 | Middleton et al. ................... 349/149 |

* cited by examiner

*Primary Examiner*—Kenneth Parker
*Assistant Examiner*—Mike Qi
(74) *Attorney, Agent, or Firm*—Myers Bigel Sibley & Sajovec

(57) ABSTRACT

A liquid crystal display module in which a series of overlying sheets can be prevented from wrinkling by fixing the sheets to a mold frame using a fixing member such as the positioner and the earth clips without using the fixing tape and the sheets are provided with an appropriate level of thermal expansion space, thereby eliminating wrinkling. As a result, displaying performance of the LCD device can be significantly enhanced.

63 Claims, 9 Drawing Sheets

LIQUID CRYSTAL DISPLAY MODULE

This application claims benefit to provisional application 60/073,061 filed Jan. 29, 1998.

FIELD OF THE INVENTION

The present invention relates to a liquid crystal display (LCD) module and, more particularly to an LCD module in which a series of overlying sheets are fixed using movable fixing members such as a positioner, an earth clip and the like that prevent wrinkling of the sheets and thereby prevent degradation of the displaying performance which may otherwise occur when the sheets are fixed using conventional fixing devices, such as tape.

BACKGROUND OF THE INVENTION

LCD devices are a well known form of flat panel display. Because they are typically smaller, lighter and because they typically use less power than cathode ray tubes (CRTs), LCD devices are often considered a preferred type of display device. LCD devices having various structures are disclosed in U.S. Pat. No. 5,387,922 entitled *"Apparatus for driving an LCD module with one driving circuit"*, U.S. Pat. No. 5,510,915 entitled *"Out active matrix LCD"*, U.S. Pat. No. 5,684,555 entitled *"Liquid crystal display panel"*, U.S. Pat. No. 5,729,316 entitled *"Liquid crystal display module"*, and U.S. Pat. No. 5,777,611 entitled *"Apparatus for controlling power sequence of an LCD module"*.

In conventional LCD devices, a series of overlying sheets are typically disposed between a light guide plate and an LCD panel. The overlying sheets typically include a diffusing sheet and a prism sheet that are configured to receive and modify the character of the light. A protecting sheet is also typically included for protecting the diffusing and prism sheets from being damaged. Collectively, these sheets will be referred to hereinafter as "the series of overlying sheets", the "overlying sheets", or "the sheets".

The light guide plate and the series of overlying sheets are typically adhered to each other via tape, such as a double-sided adhesive tape, so as to resist movement caused by external impacts. The above components are also typically secured via double-sided adhesive tape to the bottom of a mold frame, to thereby achieve a stable structure for the LCD device. The use of tape to secure various members together is well known. See, for example, U.S. Pat. No. 5,477,779 entitled *"Printing drum and method for attaching heat shrinkable screen"*, U.S. Pat. No. 5,665,607 entitled *"Method for producing thin film solar cell"*, U.S. Pat. No. 5,620,129 entitled *"Device and method for forming and attaching an array of conductive balls"*, and U.S. Pat. No. 5,477,422 entitled *"Illuminated LCD apparatus"*.

In conventional LCD devices, image data is typically displayed via light provided from a lamp. Unfortunately, lamps typically produce heat with the light. The heat discharged from a lamp can cause a series of overlying sheets secured to a mold frame of an LCD device to expand as a result of thermal expansion. However, if the sheets are secured to a mold frame thermal expansion of the sheets may be hindered. As a result, undesirable stresses may result. Such thermally-induced stresses may cause the sheets to wrinkle because the sheets may be extremely thin and may have weak resistance to external impacts. Wrinkling may degrade a the displaying performance of an LCD device.

SUMMARY OF THE INVENTION

It is therefore an object of the present invention to provide a LCD module capable of preventing sheets thereof from being moved without using a fixing member such as tape.

It is another object of the present invention to provide an LCD module wherein sheets are fixed to a mold frame using a fixing member instead of fixing tape so as to reduce thermally-induced stress.

It is still another object of the present invention to provide an LCD module wherein deformation of sheets, via thermally-induced stress, can be reduced.

It is another object of the present invention to enhance the displaying performance of LCD devices.

To achieve the above objects, there is provided, in accordance with the present invention, an LCD module including: a mold frame accommodating a light guide plate, a series of sheets, and an LCD panel; a lamp disposed at an end portion of the mold frame and which emits light to the LCD panel via the light guide plate and sheets; a top chassis enclosing the mold frame; a printed circuit board having an earth terminal and which is electrically connected to the LCD panel and controls a driving state of the LCD panel; and a positioner being erected and inserted between the mold frame and the LCD panel and which fixes the sheets onto the mold frame by perforating the overlying sheets and mold frame.

Preferably, the positioner includes: a first head which is located on an uppermost sheet of the overlying sheets and fixed to an edge portion of the sheets; a first pin which is formed by extending a portion of the first head orthogonally and inserted into the mold frame passing through the overlying sheets; and a second pin which is formed by extending another portion of the first head orthogonally and inserted into the mold frame without perforating the sheets.

Preferably, the overlying sheets include: a first through hole for insertion of the first pin, which is formed by perforating the overlying sheets at a common portion thereof corresponding to the bottom of the first pin at a time; and a first groove for passage of the second pin which is formed at an end portion of the first through hole by cutting away the overlying sheets at a common portion thereof corresponding to the bottom of the second pin at a time.

Preferably, the first through hole does not contact the first pin and is formed as a slit.

Preferably, the first through hole is disposed in a fashion that its lengthwise direction is parallel with a sheet expansion direction.

Preferably, the first through hole is disposed in a fashion that its lengthwise direction is parallel with a direction of the sheets.

Preferably, a first fixing hole for fixation of the first pin is formed by perforating the mold frame at a portion thereof corresponding to the first through hole, and a second fixing hole for fixation of the second pin is formed by perforating the mold frame at a portion thereof corresponding to the first groove.

Preferably, the first and second fixing holes contact the first and second pins.

Preferably, the mold frame further includes a stopper projecting member for preventing the sheets from being overly pressed by the first head, the stopper projecting member being formed around the first fixing hole upwardly to a height equal to the total thickness of the overlying sheets, inserted through the sheets and contacting the first head.

Preferably, the positioner includes: a second head which is located on an uppermost sheet of the overlying sheets and fixed to an edge portion of the sheets; a third pin which is formed by extending a portion of the second head orthogonally and inserted into the mold frame passing through the sheets; and a locking member which is formed at the bottom of the third pin as a single body.

Preferably, the overlying sheets include a second through hole for insertion of the third pin, which are formed by perforating the overlying sheets at a common portion thereof corresponding to the bottom of the third pin at a time.

Preferably, the second through hole does not contact the third pin and is formed as a slit.

Preferably, the second through hole is disposed in a fashion that its lengthwise direction is parallel with a sheet expansion direction.

Preferably, the second through hole is disposed in a fashion that its lengthwise direction is parallel with those of the sheets.

Preferably, a third fixing hole for fixation of the third pin is formed by perforating the mold frame at a portion thereof corresponding to the second through hole.

Preferably, the third fixing hole contacts the third pin.

Preferably, the mold frame in contact with the locking member further includes at the bottom thereof a deviation preventive groove which is communicated with the sheets and prevents any deviation of the locking member.

Preferably, the locking member has an inverse triangular cross-section.

Preferably, the positioner includes: a third head located on an uppermost sheet of the overlying sheets and fixed to an edge portion of the sheets; and a pair of fourth pins formed by extending respective portions of the third head orthogonally and respectively inserted into the mold frame without passing through the sheets.

Preferably, the overlying sheets include: a third through hole formed at a common portion thereof between the fourth pins; and a pair of second grooves which are formed by cutting away the overlying sheets at respective common portions thereof corresponding to the bottoms of the pair of fourth pins.

Preferably, the mold frame includes a pair of fourth fixing holes for fixation of the fourth pins, which are formed by perforating the mold frame at a portion thereof corresponding to the second grooves.

Preferably, the fourth fixing holes contact the fourth pins.

Preferably, the mold frame further includes a pressure preventing member for preventing the sheets from being overly pressed by the third head, the pressure preventing member being formed on the mold frame at a portion thereof corresponding to the third through hole upwardly to a height equal to the total thickness of the overlying sheets, inserted through the sheets and contacting the third head.

Preferably, the pressure preventing member does not contact the third through hole.

Preferably, the third through hole is formed as a slit.

Preferably, the third through hole is disposed in a fashion that its lengthwise direction is parallel with a sheet expansion direction.

Preferably, the third through hole is disposed in a fashion that its lengthwise direction is parallel with those of the sheets.

Preferably, the positioner includes: a fourth head which is located on an uppermost sheet of the overlying sheets and fixed to an edge portion of the sheets; a fifth pin which is formed by extending a portion of the fourth head orthogonally and inserted into the mold frame passing through the sheets; and a pair of sixth pins which are formed integrally with the fourth head and by extending both portions of the fourth head orthogonally and inserted into the mold frame without passing through the sheets.

Preferably, the overlying sheets include: a fourth through hole for insertion of the fifth pin, which is formed by perforating the overlying sheets at a common portion thereof corresponding to the bottom of the fifth pin at a time; and a pair of third grooves for passage of the sixth pins, which are formed by cutting away the overlying sheets at respective common portions thereof corresponding to the bottoms of the pair of sixth pins.

Preferably, the fourth through hole does not contact the fifth pin.

Preferably, the fourth through hole is formed as a slit.

Preferably, the fourth through hole is disposed in a fashion that its lengthwise direction is parallel with a sheet expansion direction.

Preferably, the fourth through hole is disposed in a fashion that its lengthwise direction is parallel with those of the sheets.

Preferably, the mold frame includes: a fifth fixing hole for fixation of the fifth pin, which is formed in the mold frame at a portion thereof corresponding to the fourth through hole; and a pair of sixth fixing holes for fixation of the sixth pins which are formed in the mold frame at portions respectively corresponding to the pair of third grooves.

Preferably, the fifth, sixth fixing holes respectively contact the fifth, sixth pins.

The above and other objects are satisfied according to another embodiment of the present invention by providing an LCD module including: a mold frame accommodating a light guide plate, a series of overlying sheets and an LCD panel; a lamp disposed at an end portion of the mold frame and which emits light to the LCD panel via the light guide plate and the overlying sheets; a top chassis enclosing the mold frame; a printed circuit board (PCB) provided with an earth terminal and which is electrically connected to the LCD panel and controls a driving state of the LCD panel; and an earth clip fitted onto an end portion of the mold frame and which discharges via the top chassis an electronic wave output from the PCB by electrically connecting the earth terminal and the top chassis and holds the overlying sheets so as to resist movement via external forces.

Preferably, the earth clip has an angular, C-shaped configuration, and includes an upper surface, a side surface, and a lower surface. The earth clip is mounted onto the mold frame such that the side surface thereof faces toward a surface of the mold frame. In addition, the lower surface of the earth clip is configured to contact the earth terminal of the PCB. The upper surface of the earth clip further includes a reversed, L-shaped member that is configured to overlie the sheets and thus restrict them.

Preferably, the mold frame further includes a clamping portion for exposing end portions of the sheets, formed at the portion corresponding to an area of the upper surface of the earth clip for fixing the sheets.

Preferably, the clamping portion of the mold frame includes a projecting member projected from the clamping portion to a height equal to the total thickness of the overlying sheets so that the earth clip can be smoothly mounted. The projecting member has a semicircular cross-section.

Preferably, the earth clip has an angular, C-shaped configuration and includes an upper, a side surface, and a lower surface. The earth clip is mounted onto the mold frame such that the side surface thereof faces toward a surface of the mold frame. The upper surface thereof is placed over the sheets and fixes them while one end portion of the lower surface thereof is extended along the edge of the mold frame so as to contact the earth terminal of the PCB.

Here, the mold frame further includes a clamping portion for exposing end portions of the sheets, formed at the portion thereof corresponding to the upper surface of the earth clip for fixing the sheets.

Preferably, the clamping portion of the mold frame includes a projecting member formed by a portion thereof so as to fix the sheets.

Here, the sheets further include a sheet through hole for inserting the projecting member, at a portion thereof corresponding to the projecting member.

Preferably, the sheet through hole does not contact the projecting member.

Preferably, the sheet through hole is formed as a slit.

Preferably, the sheet through hole is disposed in a fashion that its lengthwise direction is parallel with a sheet expansion direction.

Preferably, the sheet through hole is disposed in a fashion that its lengthwise direction is parallel with those of the sheets.

Preferably, the clamping portion includes a pair of supporting surface members formed in both portions opposing from the projecting member. The supporting surface members support the upper surface of the earth clip, and prevent the sheets from being overly pressed by the upper surface of the earth clip.

Preferably, the supporting surface further includes a clip locking member for locking the upper surface of the earth clip. The upper surface of the earth clip further includes a locking aperture for insertion of the clip locking member, at a portion corresponding to the clip locking member.

Therefore, an LCD module according to the present invention is capable of preventing the sheets thereof from wrinkling.

BRIEF DESCRIPTION OF THE DRAWINGS

The above objectives and other advantages of the present invention will become more apparent by describing in detail the preferred embodiments thereof with reference to the accompanying drawings, in which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those having skill in the art.

Figure 1:
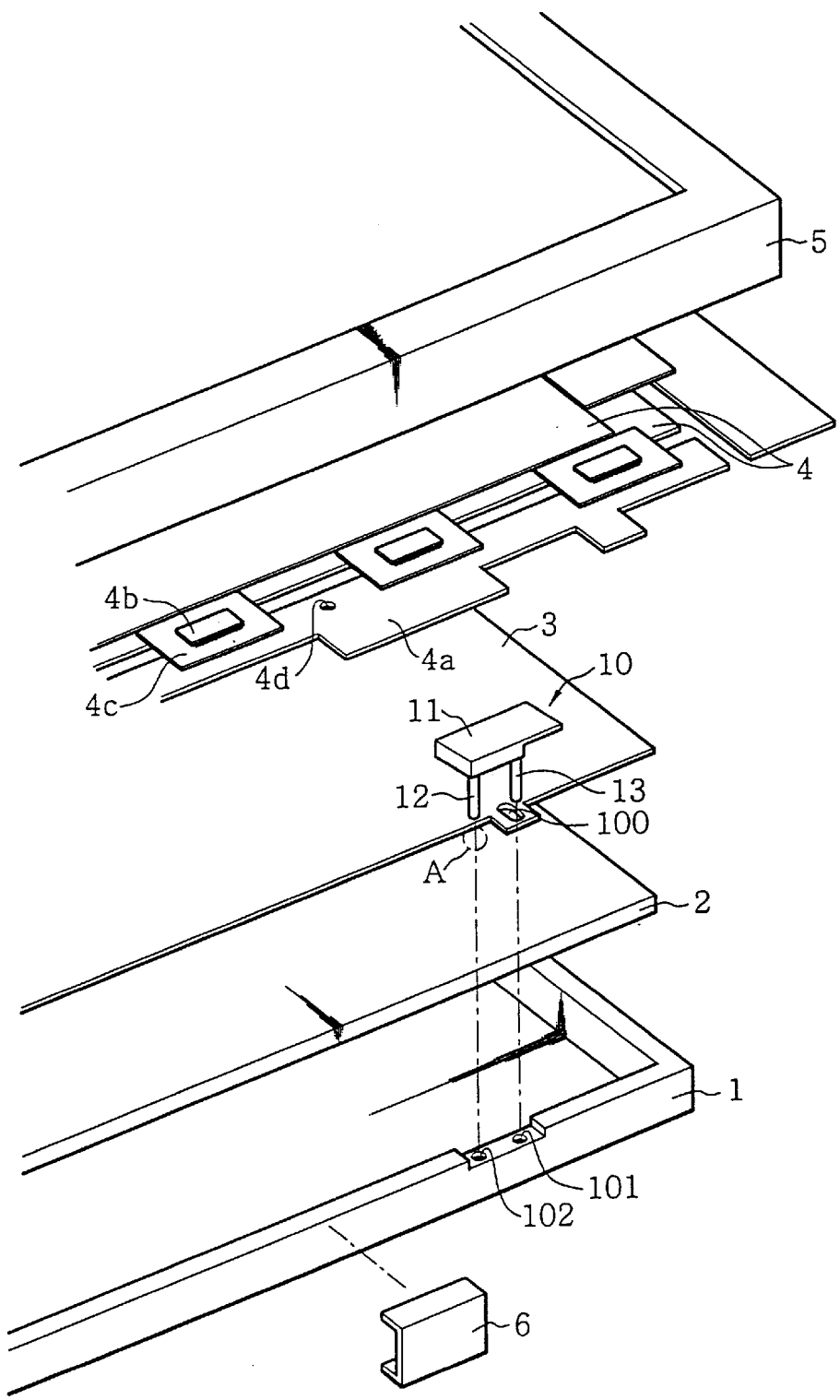
FIG. 1 is a perspective view showing an LCD module having a positioner according to a first embodiment of the present invention.

Referring to FIG. 1, an LCD module according to the present invention includes a lamp (not shown) disposed at a mold frame 1 that supports internal parts of the LCD module. A light guide plate 2, which receives the light from the lamp and transmits the light uniformly to an LCD panel 4, is positioned in the mold frame 1, as illustrated.

A series of overlying sheets 3 are inserted between the light guide plate 2 and the LCD panel 4. The overlying sheets 3 may include a diffusing sheet and a prism sheet that receive and modify the character of the light, and a protecting sheet that protects the diffusing and prism sheets from being damaged. Overlying sheets are understood by those skilled in the art of LCD devices and need not be described further herein.

A top chassis 5, preferably formed from stainless steel, encloses the mold frame 1 which accommodates the lamp, the light guide plate 2, the series of overlying sheets 3 and the LCD panel 4.

A printed circuit board (PCB) 4a having a plurality of circuit patterns is electrically connected to the LCD panel 4, and is driven by a control signal input from an external device. The printed circuit board 4a controls the overall driving state of the LCD panel 4.

A tape automated bonding (TAB) substrate 4c mounted with a semiconductor chip 4b is attached between the LCD panel 4 and the PCB 4a via an anisotropic conductive film (ACF) as would be known to those of skill in the art. The TAB substrate 4c connects the PCB 4a and the LCD panel 4 so that the control signal output from the PCB 4a can be rapidly transmitted to the LCD panel 4.

Generally, the PCB 4a controls an LCD device using a high frequency signal, and generates a large amount of electromagnetic waves which can hinder normal operation of the LCD device, thereby significantly degrading, display performance. Therefore, an earth (ground) terminal 4d is formed on the PCB 4a so as to ground any electromagnetic waves.

When the light guide plate 2, sheets 3, and the LCD panel 4 are accommodated in the mold frame 1, and are enclosed by the top chassis 5, the PCB 4a rotates 180°, bending the TAB substrate 4c, and is positioned at the rear surface of the mold frame 1. The TAB substrate 4c is flexible and is not damaged by the bending.

The earth terminal 4d on the PCB 4a is configured to contact an earth clip 6. The earth clip 6 is mounted onto the mold frame 1. A lower surface of the earth clip 6 contacts the earth terminal 4d. A side surface of the earth clip 6 contacts the top chassis 5 enclosing the mold frame 1 to thereby form an electromagnetic wave discharge path from the PCB 4a to the top chassis 5. An electromagnetic wave discharged from the PCB 4a passes from the earth terminal 4d to the top chassis 5 via the earth clip 6 and is thereby rapidly discharged out.

According to a first embodiment of the present invention, the sheets 3 are secured to the mold frame 1 via a positioner 10. The positioner 10 is inserted between the mold frame 1 and the LCD panel 4, and passes through the sheets 3 which are overlying in the mold frame 1. The positioner 10 is inserted into the mold frame 1 so as to secure the sheets 3 to the mold frame 1, as illustrated in FIG. 1.

Figure 2:
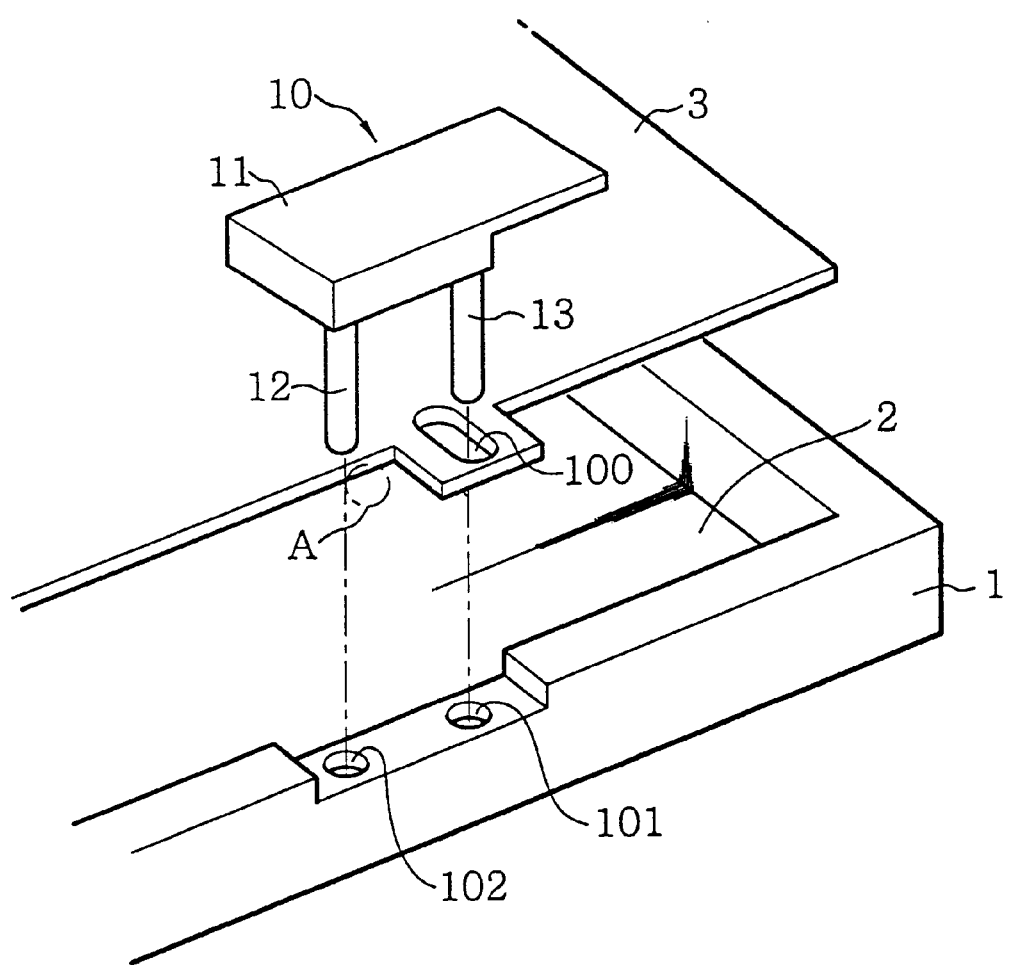
FIG. 2 is an enlarged fragmentary view of the positioner and LCD module of FIG. 1.

As shown in FIG. 2, the positioner 10 includes a first head 11 having a first pin 13 and a second pin 12 extending orthogonally therefrom. The first pin 13 is configured to be inserted into a first fixing hole 101 in the mold frame 1 (after passing through the sheets 3), and the second pin 12 is configured to be inserted into a second fixing hole 102 in the mold frame 1 without passing through the sheets 3.

The through hole 100 in the sheets 3 is formed by perforating the overlying sheets 3 at a common portion thereof corresponding to the bottom of the first pin 13. A first groove A for passage of the second pin 12 is formed by cutting away the overlying sheets at a common portion thereof corresponding to the bottom of the second pin 12, as illustrated.

The mold frame 1 first fixing hole 101 for fixation of the first pin 13 is formed by perforating the mold frame 1 at a portion thereof corresponding to the first through hole 100. A second fixing hole 102 for fixation of the second pin 12, is formed by perforating the mold frame 1 at a portion thereof corresponding to the first groove A.

Preferably, the first through hole 100 is formed as a slit so that the first pin 13 does not contact the sheets 3. The first through hole 100 is oriented such that its lengthwise direction is parallel with the direction of expansion of the sheets 3, which is preferably the lengthwise direction of the sheets 3.

Generally, the sheets 3 react more actively when their sides to which the heat is transmitted are longer than when their sides are shorter. Therefore, in the present invention, the through hole 100 is formed as a slit and is disposed in a fashion such that its lengthwise direction is generally parallel with the expansion direction of the sheets 3 and, preferably, the lengthwise direction of the sheets 3. Thus, the sheets 3 can expand thermally without undesirable contact with the first pin 13.

Figure 3A:
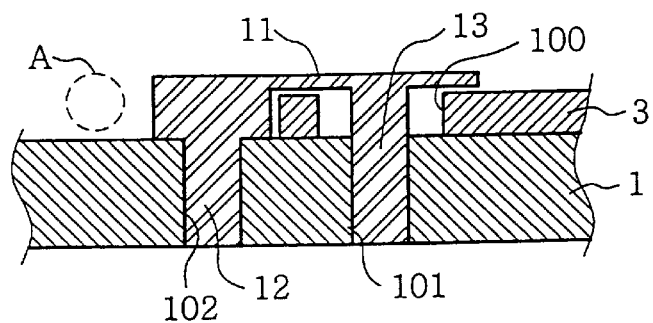
FIGS. 3A through 3C are section views showing various assembled configurations of a positioner and mold frame according to the embodiment illustrated in FIGS. 1 and 2.
Figure 3B:
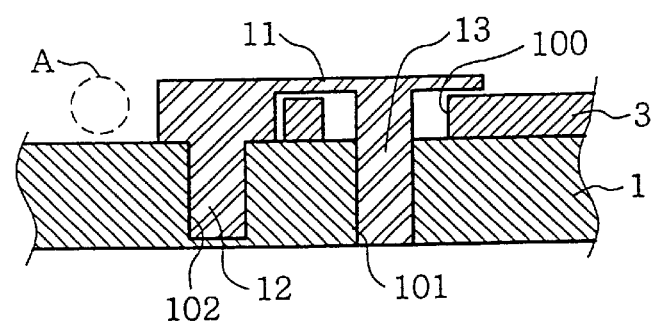

Preferably, the first and second fixing holes 101, 102 each have a shape and size corresponding to the first and second pins 13, 12 so that the first and second pins 13, 12 can be respectively press-fitted into the first and second fixing holes 101, 102. Thus, the first pin 13 is firmly inserted into the first fixing hole 101 passing through the first through hole 100. The second pin 12 is firmly inserted into the second fixing hole 102 passing through the first groove A. The first and second fixing holes 101, 102 may be formed as through holes as shown in FIG. 3A and may be formed as a through hole and a groove as shown in FIG. 3B.

The first and second pins 13, 12 are firmly inserted into the first and second fixing holes 101, 102 of the mold frame 1 without direct contact with the sheets 3, and serve as main fixing members for strengthening the fixed structure of the first head 11. In this case, the first head 11 is firmly fixed onto the sheets 3 by the first and second pins 13, 12, and is placed on the sheets 3, with a small gap between the first head 11 and the sheets 3. In this manner, the first head 11 can restrict the movement of the sheets 3. The first head 11 does not directly contact the sheets 3. Accordingly, the sheets 3 can thermally expand without restriction by the head 11.

The present invention overcomes the limitations of conventional LCD devices, wherein a series of sheets are directly fixed to a mold frame via tape. As described above, directly securing sheets to a mold frame can hinder thermal expansion of the sheets, which can cause sheet wrinkling. The present invention, by contrast, allows thermal expansion of the sheets to occur.

In the present invention, the first and second pins 13, 12 are firmly inserted into the first and second fixing holes 101, 102 of the mold frame 1 without direct contact with the sheets 3 so as to enhance a fixed structure of the first head 11. In addition, the first head 11 can restrict the movement of the sheets 3. As a result, the sheets 3 can be firmly fixed to the mold frame 1 without restriction in thermal expansion space. Here, the sheets 3 are provided with an appropriate level of thermal expansion space, thereby eliminating the possibility of wrinkling. As a result, display performance of an LCD device incorporating the present invention can be significantly enhanced.

Figure 3C:
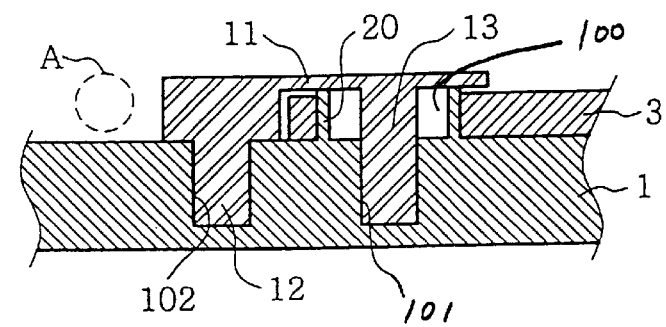

As shown in FIG. 3C, the mold frame 1 may further include a stopper projecting member 20 which is formed by extending a portion of the mold frame 1 around the first fixing hole 101 upwardly to a height equal to the total thickness of the sheets 3. The stopper projecting member 20 is inserted into the sheets 3 and contacts the first head 11 so as to prevent the sheets 3 from being overly pressed by the first head 11, as illustrated.

As shown in FIG. 3C, the first through hole 100 formed through the sheets 3 is enlarged to permit insertion of the stopper projecting member 20. Accordingly, the stopper projecting member 20 prevents the sheets 3 from being overly pressed by the first head 11 which can hinder the thermal expansion of the sheets 3.

Figure 4:
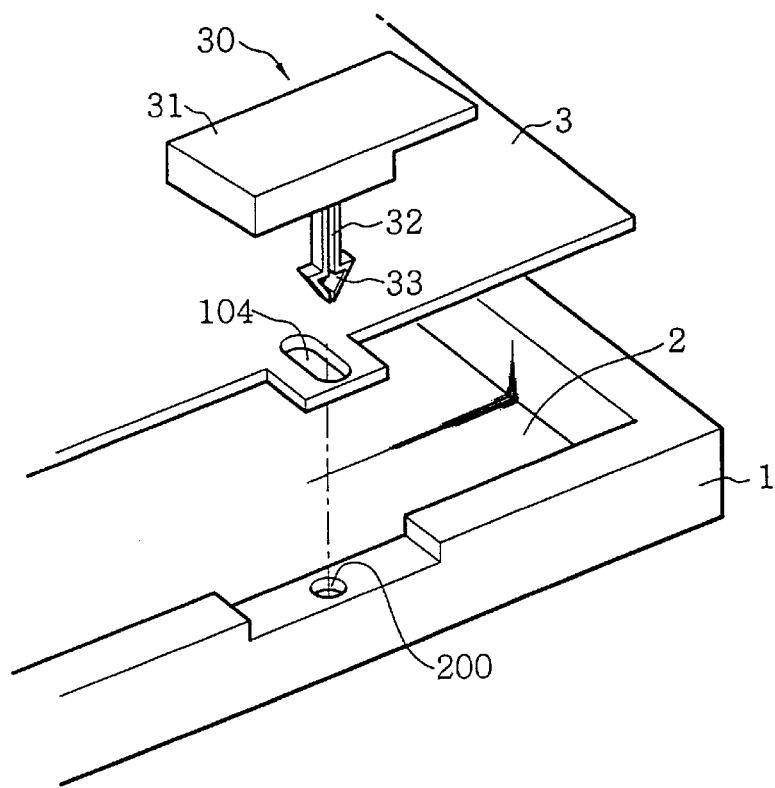
FIG. 4 is a perspective view of a positioner and a mold frame according to a second embodiment of the present invention.

Referring to FIG. 4, a positioner 30 according to a second embodiment of the present invention includes a second head 31 which is located on an uppermost sheet of the sheets 3 and is fixed to a side portion of the sheets 3. A third pin 32 extends orthogonally from the second head 31 and is configured to be inserted into the mold frame 1 after passing through the sheets 3, as illustrated. A locking member 33 is formed at the bottom end of the third pin 32 as illustrated and is configured to retain the third pin in a secured relationship within the third fixing hole 200 as illustrated in FIG. 5.

A second through hole 104 for insertion of the third pin 32 is formed by perforating the overlying sheets 3 at a common portion thereof corresponding to the location of the third pin 32 as illustrated in FIG. 4. A third fixing hole 200 for fixation of the third pin 32 is formed by perforating the mold frame 1 at a portion thereof corresponding to the second through hole 104.

Preferably, the second through hole 104 is configured such that its lengthwise direction is parallel with the expansion direction of the sheets 3. In the illustrated embodiment, the lengthwise direction of the sheets 3 is the expansion direction. Accordingly, the sheets 3 can expand thermally without undesirable contact with the third pin 32.

Figure 5:
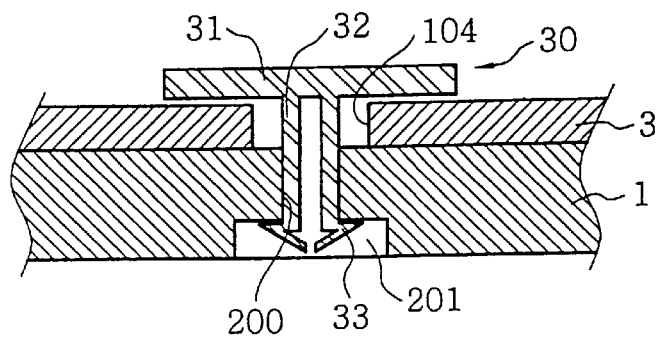
FIG. 5 is a section view showing an assembled configuration of the positioner and the mold frame of FIG. 4.

Preferably, the third fixing hole 200 has a shape and size corresponding to the third pin 32 so that the third pin 32 can be firmly fitted into the third fixing hole 200 as illustrated in FIG. 5. The third pin 32 is firmly inserted into the third fixing hole 200 without direct contact with the sheets 3, to thereby serve to strengthen the fixed structure of the second head 31. In this case, the second head 31 is placed on the sheets 3, having a small gap between the sheets 3, so as to restrict movement of the sheets 3, as illustrated in FIG. 5. As a result, the sheets 3 can be firmly fixed to the mold frame 1 without restriction in thermal expansion space. Preferably, the sheets 3 are provided with an appropriate level of thermal expansion space, thereby eliminating the possibility of wrinkling caused by thermal expansion. As a result, display performance of an LCD device can be significantly enhanced.

As shown in FIG. 5, the third pin 32 and the locking member 33 are separated from each other. This structure allows the third pin 32 and the locking member 33 to smoothly pass through the third fixing hole 200 which has a smaller diameter than the locking member 33. The third pin 32 and the locking member 33 are strongly pressed by the third fixing hole 200 when they pass through the third fixing hole 200. Thus, the third pin 32 and the locking member 33 are combined into one so that the total thickness of the third pin 32 and the locking member 33 can be reduced to pass through the third fixing hole 200. When passage through the third fixing hole 200 is complete, the combined pin 32 and locking member 33 are separated again, as would be understood by those skilled in the art.

A deviation preventive groove 201 for preventing any deviation of the locking member 33 is formed at the bottom of the mold frame 1. The locking member 33 is firmly fixed by the deviation preventive groove 201, as illustrated in FIG. 5. Preferably, the locking member 33 has an inverse triangular cross-section. This results in an enhanced locking efficiency.

According to the second embodiment of the present invention, when the positioner 30 is used for fixing the sheets 3 to the mold frame 1, the sheets 3 can be prevented from being overly pressed because the locking member 33 allows the positioner 30 to easily fit into the mold frame 1. As a result, the head 31 can be prevented from contact with the sheets 3.

Figure 6:
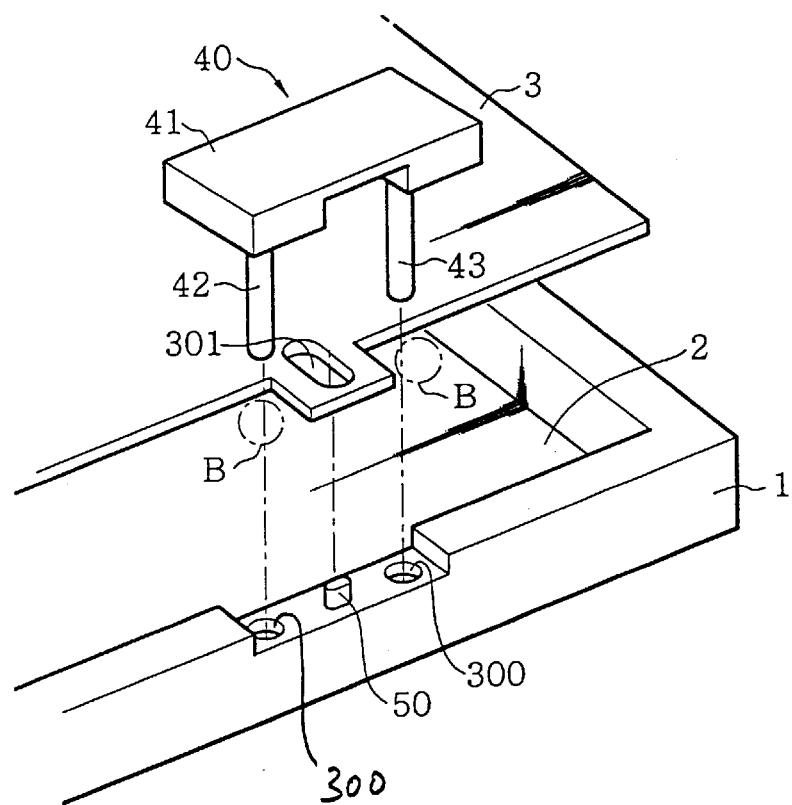
FIG. 6 is a perspective view showing a positioner and a mold frame according to a third embodiment of the present invention.

Referring now to FIG. 6, a positioner 40 according to a third embodiment of the present invention includes a third head 41 located on an uppermost sheet of the sheets 3 and fixed to an edge portion of the sheets 3. The positioner 40 includes a pair of fourth pins 42, 43 which extend orthogonally from the head 41 and are configured to be inserted into the mold frame 1 without passing through the sheets 3.

A third through hole 301 is formed by perforating the overlying sheets 3 at a portion thereof between the two portions corresponding to the fourth pins 42, 43, as illustrated in FIG. 6. A pair of second grooves B for passage of the fourth pins 42, 43 are formed by cutting away the overlying sheets 3 at portions on both sides of the third through hole 301.

In addition, a pair of fourth fixing holes 300 for fixation of the fourth pins 42, 43 are formed by perforating the mold frame 1 at portions corresponding to the second grooves B. Preferably, the respective fourth fixing holes 300 have a shape and size corresponding to the fourth pins 42, 43 so that the fourth pins 42, 43 are respectively press-fitted into the fourth fixing holes 300 without passing through the sheets.

As shown in FIG. 6, the mold frame 1 further includes a pressure preventing member 50 for preventing the sheets 3 from being overly pressed by the third head 41. The pressure preventing member 50 is formed on the mold frame 1, at a portion thereof corresponding to the third through hole 301 in the sheets 3. The pressure preventing member 50 extends upwardly to a height equal to the total thickness of the overlying sheets 3. As illustrated, the pressure preventing member 50 is inserted through the sheets 3 and contacts the third head 41.

Preferably, the third through hole 301 is formed as a slit and disposed in a fashion that its lengthwise direction is parallel with the expansion direction of the sheets 3, which is preferably, the lengthwise direction of the sheets 3. Thus, the sheets 3 can expand thermally without undesirable contact with the pressure preventing member 50.

Figure 7:
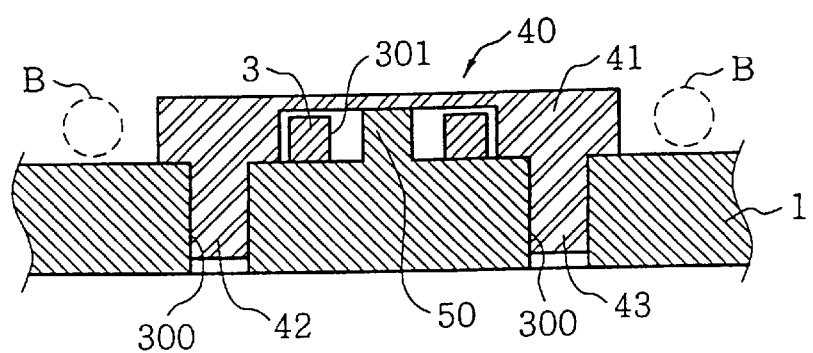
FIG. 7 is a section view showing an assembled configuration of the positioner and the mold frame of FIG. 6.

Referring now to FIG. 7, the fourth pins 42, 43 are firmly inserted into the fourth fixing holes 300 of the mold frame 1 without direct contact with the sheets 3 so as to enhance a fixed structure of the third head 41. In addition, a small gap exists between the sheets 3 and the third head 41 so that movement of the sheets 3 is not restricted. As a result, the sheets 3 can be firmly fixed to the mold frame 1 without restriction in thermal expansion space. When the fourth pins 42, 43 are pressed into the fourth fixing holes 300, the pressure preventing member 50 supports the third head 41 so that the third head 41 can be prevented from being excessively pressed into contact with the sheets 3. The sheets 3 are provided with an appropriate level of thermal expansion space, thereby eliminating the possibility of wrinkling. As a result, display performance of an LCD device incorporating the present invention can be significantly enhanced.

Figure 8:
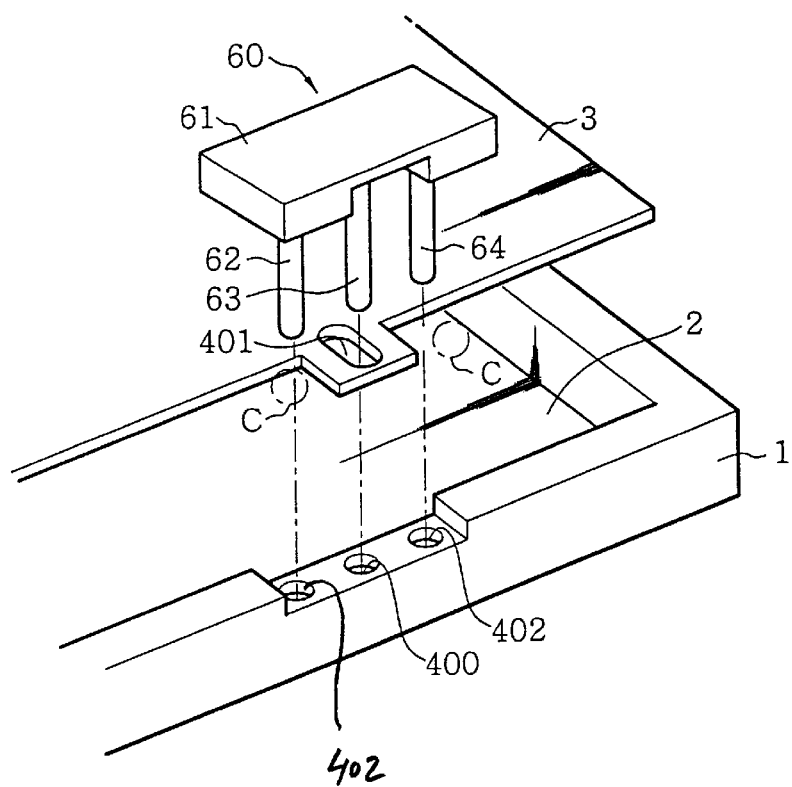
FIG. 8 is a perspective view showing a positioner and a mold frame according to a fourth embodiment of the present invention.

Referring now to FIG. 8, a positioner 60 according to a fourth embodiment of the present invention includes a fourth head 61 which is located on an uppermost sheet of the sheets 3 and fixed to an edge portion of the overlying sheets 3. A fifth pin 63 and a pair of sixth pins 62, 64 extend orthogonally from the fourth head as illustrated. The fifth pin 63 is configured to be inserted into the mold frame 1 through the sheets 3.

The sheets 3 includes a fourth through hole 401 for insertion of the fifth pin 63. The fourth hole 401 is formed by perforating the overlying sheets 3 at a common portion thereof corresponding to the bottom of the fifth pin 63. The sheets 3 also include a pair of third grooves C for passage of the sixth pins 62, 64. The third grooves C are formed by cutting away the overlying sheets 3 at portions that respectively correspond to the bottoms of the sixth pins 62, 64.

In addition, the mold frame 1 includes a fifth fixing hole 400 for fixation of the fifth pin 63, which is formed by perforating the mold frame 1 at a portion corresponding to the fourth fixing hole 401, and a pair of sixth fixing holes 402 for fixation of the sixth pins 62, 64, which are formed by perforating the mold frame 1 at portions that respectively correspond to the third grooves C.

Preferably, the fourth through hole 401 is formed as a slit and disposed in a fashion that its lengthwise direction is parallel with the sheets 3 expansion direction. Preferably, the expansion direction is the lengthwise direction of the sheets 3. Thus, the sheets 3 can expand thermally without undesirable contact with the fifth pin 63, as would be understood by one skilled in the art.

Preferably, the fifth and sixth fixing holes 400, 402 have a shape and size corresponding to the fifth and sixth pins 63, 62, 64 so that the fifth pin 63 is press-fitted into the fifth fixing hole 400 passing through the fourth through hole 401. In addition, the sixth pins 62, 64 are press-fitted into the sixth fixing holes 402 without passing through the sheets 3, as illustrated in FIG. 8.

Figure 9:
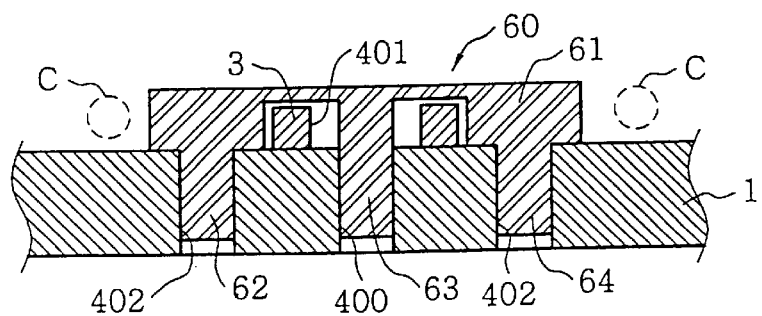
FIG. 9 is a section view showing an assembled configuration of the positioner and the mold frame of FIG. 8.

As shown in FIG. 9, the fifth and sixth pins, 63, 62, 64 are firmly inserted into the fifth and sixth fixing holes 400, 402 without direct contact with the sheets 3, to thereby serve to strengthen the fixed structure of the fourth head 61. In this case, the fourth head 61 is placed on the sheets 3, having a small gap from the sheets 3, so as to restrict movement of the sheets 3. As a result, the sheets 3 can be firmly fixed to the mold frame 1 without restriction in thermal expansion space. Here, the sheets 3 are provided with an appropriate level of thermal expansion space, thereby eliminating the possibility of wrinkling. As a result, display performance of an LCD device incorporating the present invention can be significantly enhanced.

According to this embodiment of the present invention, the sheets 3 are fixed to the mold frame 1 by three pins (i.e., the fifth and sixth pins 63, 62, 64). As a result, the sheets 3 can be more firmly fixed to the mold frame 1 in the fourth embodiment compared with the first, second and third embodiments described above.

The number of positioners utilized according to each embodiment of the present invention described above can vary. For example, four positioners can be used, where each positioner is installed to each respective corner of a mold frame. Moreover, the location of positioners can vary. For example, positioners can be installed near the corner of a mold frame, or along an edge center of a mold frame.

As described above, the earth clip 6 shown in FIG. 1 is mounted onto the clamping portion of the mold frame 1 when the PCB 4a rotates 180° and is positioned to the rear surface of the mold frame 1. Thus, the earth clip 6 connects the PCB 4a and the top chassis 5 so as to form an electromagnetic wave discharge path. The electromagnetic wave generated from the PCB 4a can be rapidly discharged out via the earth clip 6 and the top chassis 5.

In the fifth and sixth embodiments of the present invention, which will be described below, the earth clip 6 of FIG. 1 is provided with an improved structure that is capable of holding the sheets 3 as well as grounding the electromagnetic waves. Accordingly, the sheets 3 can be fixed to the mold frame 1 without using a fixing member, such as tape.

Figure 10:
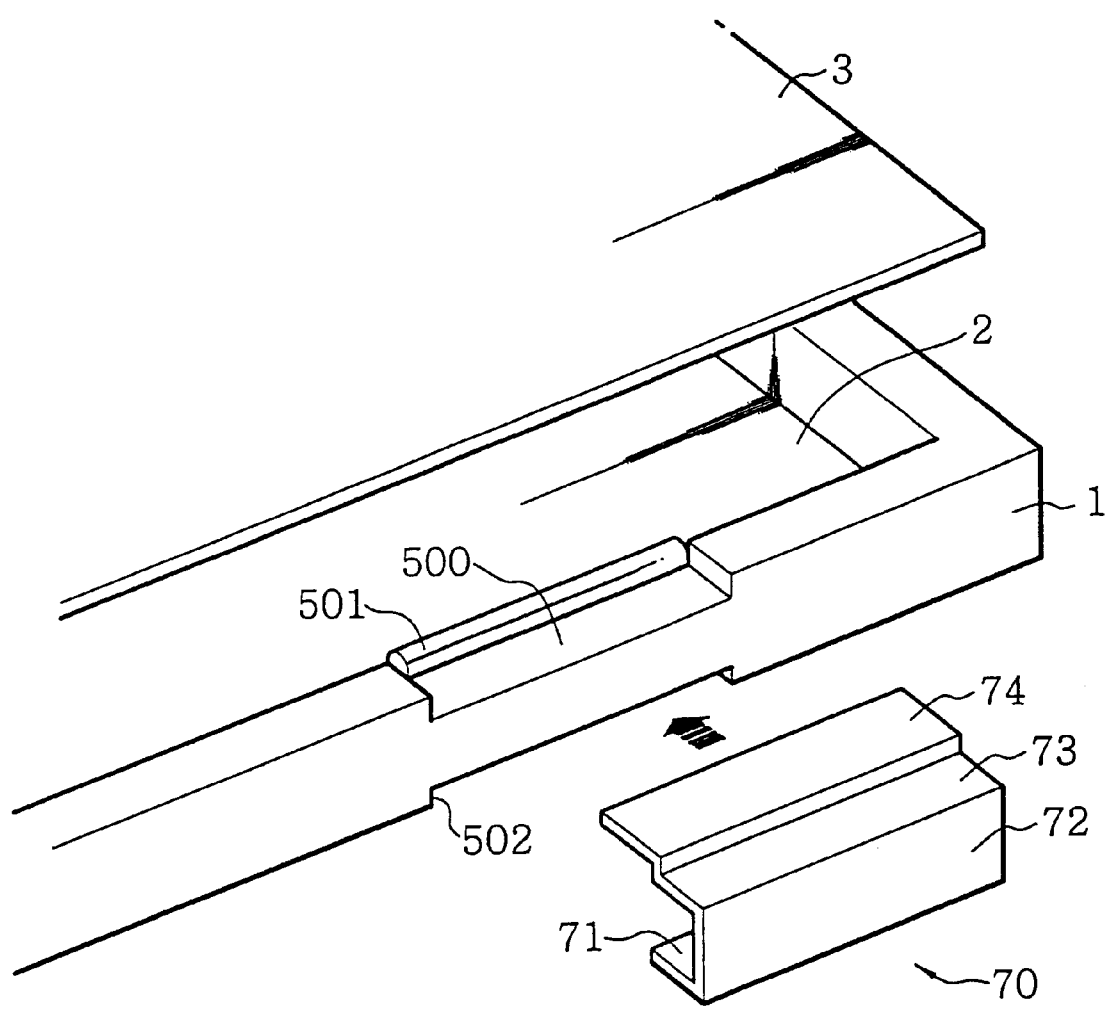
FIG. 10 is a perspective view showing an earth clip and a mold frame according to a fifth embodiment of the present invention.

As shown in FIG. 10, an earth clip 70 of the fifth embodiment of the present invention has an angular, C-shaped configuration and has an upper surface 73, a side surface 72, and a lower surface 71. A reversed, L-shaped member is further included in the illustrated earth clip 70. The horizontal portion of the reversed L-shaped member is placed on the sheets 3 and serves as a fixing plate 74 that fixes the sheets 3 to the mold frame 1.

As is described above with respect to the first embodiment, when the PCB 4a is positioned in the rear surface of the mold frame 1 and the mold frame 1 accommodates all components and the top chassis 5 encloses them, the earth clip 70 is mounted onto the mold frame 1 so that electromagnetic waves generated from the PCB 4a can be rapidly discharged out. The side surface 72 of the earth clip 70 faces the side surface of the mold frame 1, as illustrated in FIG. 10.

The mold frame 1 further includes a clamping portion 500 at a portion corresponding to the upper surface 73 of the earth clip 70. The clamping portion 500 exposes end portions of the sheets 3 outwardly from the mold frame 1 when the sheets 3 are accommodated into the mold frame 1.

The illustrated mold frame 1 of FIG. 10 further includes at the bottom thereof an earth clip fixing portion 502 for allowing the earth clip 70 to be smoothly mounted onto the mold frame 1. In addition, the earth clip fixing portion 502 serves to secure the earth clip 70 to the mold frame, and to prevent the earth clip 70 from becoming easily detached by impact.

When the earth clip 70 is mounted onto the clamping portion 500 of the mold frame 1, the side surface 72 of the earth clip 70 contacts the top chassis 5 enclosing the mold frame 1 while the lower surface 71 contacts via a screw (not shown) the earth terminal 4d of the PCB 4a positioned at the rear surface of the mold frame 1. The earth terminal (4d, FIG. 1) is preferably formed at an appropriate position of the PCB 4a so as to correctly and correspondingly contact the lower surface 71 of the earth clip 70.

As described above, an electromagnetic wave discharge path ranging from the PCB 4a to the top chassis 5 is formed. Electromagnetic waves discharged from the PCB 4a are rapidly discharged to the top chassis 5 via the earth clip 70.

When the earth clip 70 is mounted onto the mold frame 1 so as to discharge electromagnetic waves, the earth clip 70 is led to the end portions of the sheets exposed by the clamping portion 500 and thus smoothly places the fixing plate 74 over the sheets 3. At the same time, the lower surface 71 is in contact with the earth terminal 4d of the PCB 4a and is firmly fitted into the earth clip fixing portion 502, while the side surface 72 contacts the top chassis 5 enclosing the mold frame 1. The side surface 72 has a height (i.e., a thickness of the earth clip 70) similar to that between the clamping portion 500 and the earth clip fixing portion 502.

In the fifth embodiment of the present invention, the fixing plate 74 restricts movement of the sheets 3. Thus, the sheets 3 can be firmly fixed to the mold frame 1 without using a fixing member such as tape. Accordingly, an appropriate level of thermal expansion space is provided for the entire surface of the sheets 3. Accordingly, the sheets 3 can be prevented from wrinkling which may occur when the sheets 3 are fixed using the fixing tape. Therefore, display performance of an LCD incorporating the present invention can be enhanced.

The earth clip 70 of the present invention is mounted to the mold frame 1 when the PCB 4a is positioned at the rear surface of the mold frame 1. Moreover, the earth clip 70 is capable of holding the sheets 3 by restricting the movement of the sheets 3 using the fixing plate 74.

As shown in FIG. 10, a support projecting member 501 for supporting the earth clip 70 and which is projected to a height equal to the total thickness of the sheets 3 is further formed in the clamping portion 500. Accordingly, the fixing plate 74 can be smoothly mounted onto the sheets 3 without any interruption of the ends of the sheets 3. Preferably, the supporting projecting member 501 has a semicircular cross-section. Accordingly, the supporting projecting member 501 and fixing plate 74 can smoothly engage with one another.

In the fifth embodiment of the present invention, the improved earth clip 70 is capable of holding the sheets 3 as well as grounding the electromagnetic waves. Accordingly, the sheets 3 can be fixed to the mold frame 1 without using a fixing tape. The fifth embodiment of the present invention is particularly advantageous because the earth clip 70 serves two functions: to ground electromagnetic waves discharged from a PCB; and to secure the sheets 3 to a molding frame 1, without causing thermally-induced wrinkling.

Figure 11:
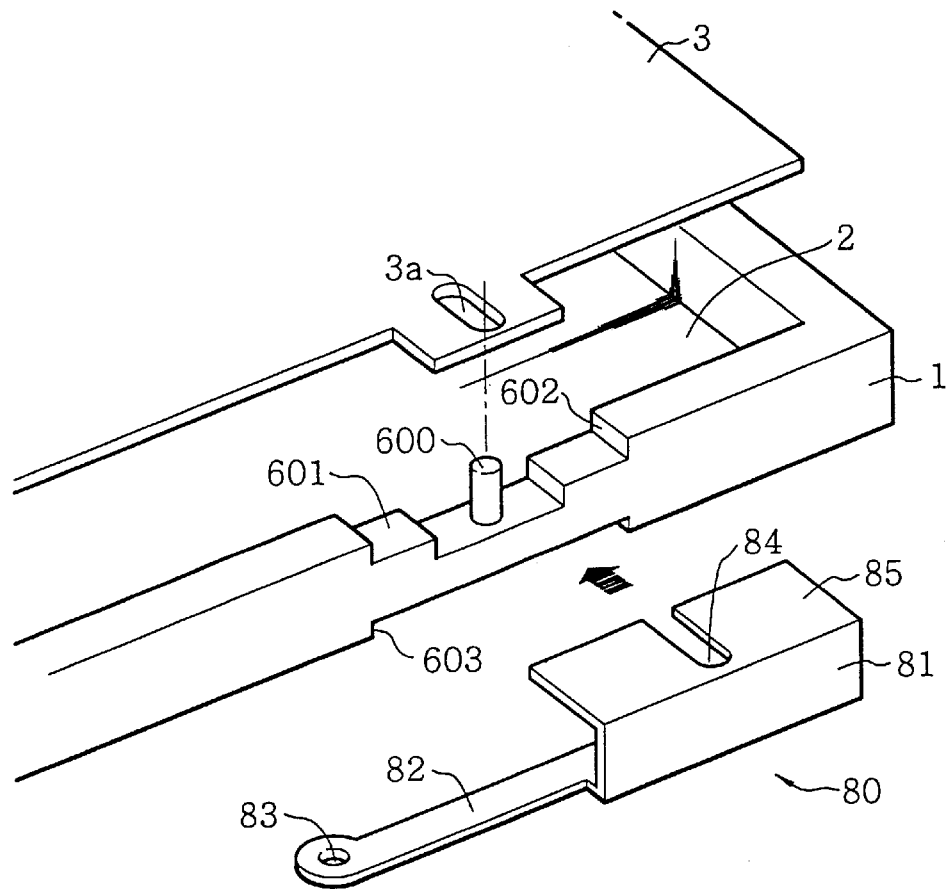
FIG. 11 is a perspective view showing an earth clip and a mold frame according to a sixth embodiment of the present invention.

Referring now to FIG. 11, an earth clip 80 according to a sixth embodiment of the present invention is illustrated. The earth clip 80 has an angular, C-shaped configuration with an upper surface 85, a side surface 81, and a lower surface 82. The lower surface 82 facing the upper surface 85 is extended in a lengthwise direction, as illustrated. An electromagnetic wave discharge terminal 83 corresponding to an earth terminal (4d, FIG. 1) of a PCB (4a, FIG. 1) is formed at the lower surface 82, as illustrated.

When the PCB 4a rotates 180° and is positioned at the rear surface of the mold frame 1 and all the components are accommodated into the mold frame 1 and enclosed by the top chassis 5, the earth clip 80 is mounted onto the clamping portion of the mold frame 1 so that electromagnetic waves generated from the PCB 4a can be rapidly discharged. The side surface 81 of the earth clip 80 faces the side surface of the mold frame 1.

Similar to the fifth embodiment, the mold frame 1 includes a clamping portion 602 which exposes end portions of the sheets 3 outwardly from the mold frame 1 when the sheets 3 are accommodated into the mold frame 1. The mold frame 1 further includes, at the bottom thereof, an earth clip fixing portion 603 for allowing the earth clip 80 to be smoothly mounted onto the mold frame 1. In addition, the earth clip fixing portion 603 serves to hold the earth clip 80 so that the earth clip 80 cannot be easily detached by impact.

When the earth clip 80 is mounted onto the mold frame 1, the side surface 81 of the earth clip 80 contacts the top chassis 5 enclosing the mold frame 1 while the electromagnetic wave discharge terminal 83 of the lower surface 82 contacts the earth terminal (4d, FIG. 1) of the PCB (4a, FIG. 1). The earth terminal (4d, FIG. 1) should be formed at an appropriate position of the PCB (4a, FIG. 1) so as to correctly and correspondingly contact the electromagnetic wave discharge terminal 83 of the lower surface 82 of the earth clip 80. As described above, an electromagnetic wave discharge path from the PCB (4a, FIG. 1) to the top chassis 5 is formed. Electromagnetic waves discharged from the PCB (4a, FIG. 1) can be rapidly discharged to the top chassis 5 via the earth clip 80.

When the earth clip 80 is mounted onto the mold frame 1 so as to discharge electromagnetic waves, the earth clip 80 is led to the end portions of the sheets 3 which are exposed by the clamping portion 602 and thus smoothly places the upper surface 85 over the sheets 3. At the same time, the lower surface 82, which is in contact with the earth terminal (4d, FIG. 1) of the PCB (4a, FIG. 1), is firmly fitted into the earth clip fixing portion 603, while the side surface 81 contacts the top chassis 5 enclosing the mold frame 1. The side surface 81 has a height (i.e., a thickness of the earth clip 80) similar to that between the clamping portion 602 and the earth clip fixing portion 603.

The clamping portion 602 further includes a projecting member 600, which is cylindrically shaped, and projects from the mold frame 1, as illustrated. In addition, a sheet through hole 3a for insertion of the projecting member 600 is formed at the corresponding portion of the sheets 3, as illustrated.

The projecting member 600 is fitted into the sheet through hole 3a. As a result, the sheets 3 can be firmly fixed by the support of projecting member 600. The projecting member 600 is projected higher than the total thickness of the sheets 3 and the upper surface 85. Accordingly, the sheets 3 fixed by the projecting member 600 are not easily detached by an impact.

The sheet through hole 3a is formed as a slit and disposed in a fashion such that its lengthwise direction is parallel with the expansion direction of the sheets 3. Preferably, the lengthwise direction of the sheets 3 is the direction of expansion. Thus, the sheets 3 can expand thermally without undesirable contact with the projecting member 600.

The earth clip 80 is mounted to the mold frame 1 by fitting an insertion groove 84 in the upper surface 85 to the projecting member 600, as illustrated in FIG. 11. The insertion groove 84 has a size corresponding to the diameter of the projecting member 600 so that the earth clip 80 may not be easily detached by impact.

The clamping portion 602 further includes a pair of support surfaces 601 formed by a predetermined space from the projecting member 600 and which are projected from the mold frame 1 as illustrated in FIG. 11. The support surfaces 601 support the upper surface 85 when the earth clip 80 is mounted to the mold frame 1 to restrict movement of the sheets 3. Thus, the support surfaces 601 serve as a stopper that prevents the sheets 3 from being overly pressed by the upper surface 85 of the earth clip 80.

Figure 12:
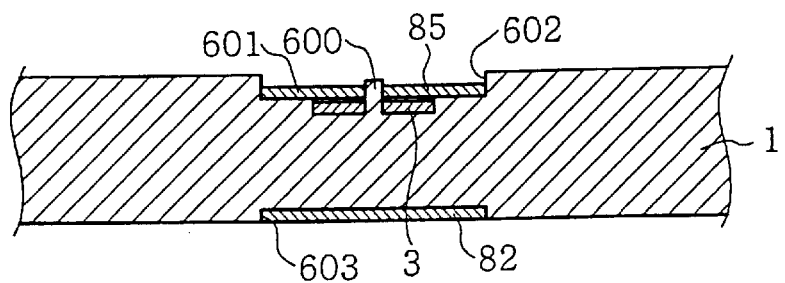
FIG. 12 is a section view showing an assembled configuration of the earth clip and the mold frame of FIG. 11.

As shown in FIG. 12, if the sheets 3 are accommodated into the mold frame 1 and fixed by the projecting member 600, the upper surface 85 is fitted to the clamping portion 602 and the lower surface 82 is fitted to the earth clip fixing portion 603, thereby mounting the earth clip 80 to the mold frame 1. The projecting member 600 passes through the sheets 3 so as to directly fix the sheets 3 to the mold frame 1. In addition, the upper surface 85 of the earth clip 80 holds sheets 3 without direct contact with the sheets 3 and thus restricts movement of the sheets 3. The sheets 3 are directly fixed by the projecting member 600 while their movements are restricted by the earth clip 80. As a result, the sheets 3 can be firmly fixed into the mold frame 1.

The sheets 3 can be firmly fixed to the mold frame 1 without using a fixing member, such as tape, and appropriate level of thermal expansion space can be provided on the whole surface of the sheets 3. Accordingly, the sheets 3 can be prevented from wrinkling which may occur when the sheets 3 are fixed using a fixing member such as tape. Therefore, display performance of an LCD device incorporating the present invention can also be enhanced.

In the sixth embodiment of the present invention, the improved earth clip 80 is capable of holding the sheets 3 as well as grounding any electromagnetic waves. Accordingly, the sheets 3 can be fixed to the mold frame 1 without using a fixing member such as tape. The sixth embodiment of the present invention is particularly advantageous because the earth clip 80 serves two functions: to ground electromagnetic waves discharged from a PCB; and to secure the sheets 3 to a molding frame 1 without causing thermally-induced wrinkling.

Figure 13:
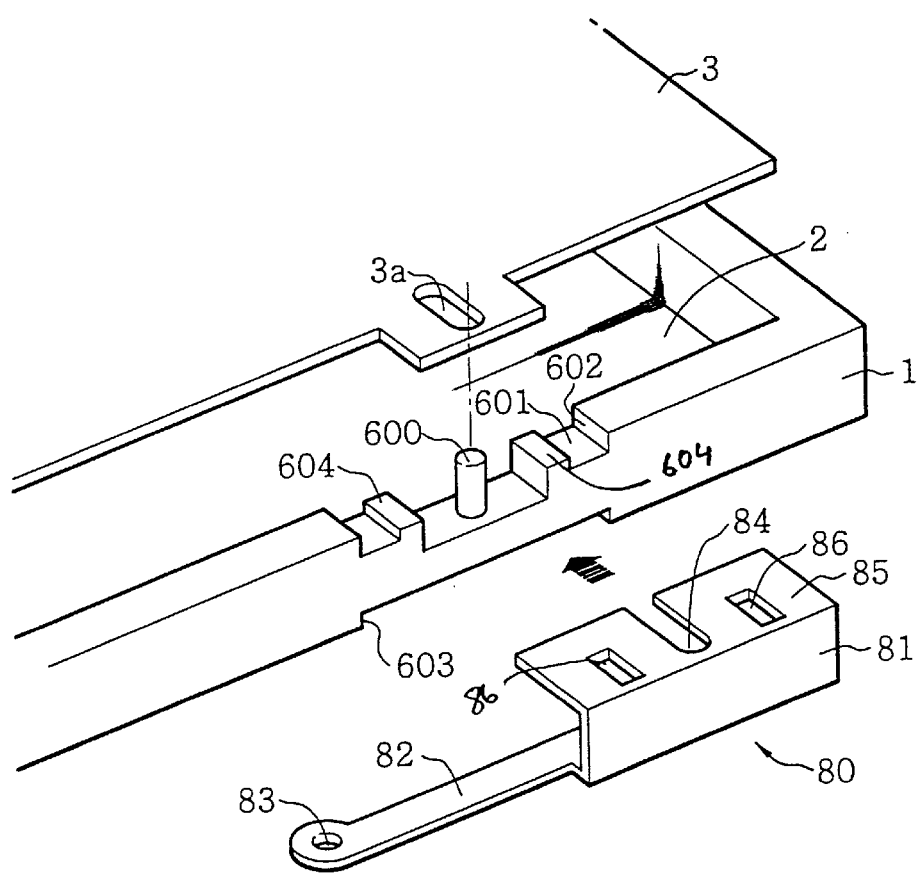
FIG. 13 is a perspective view showing an earth clip and a mold frame according to a seventh embodiment of the present invention.

Referring now to FIG. 13, the support surfaces 601 of the clamping portion 602 of the embodiment illustrated in FIG. 12 have been modified to include a pair of clip locking members 604 for locking the earth clip 80. In addition, a pair of locking apertures 86 for insertion of the clip locking members 604 are formed on the upper surface 85 of the earth clip 80. When the sheets 3 are accommodated into the mold frame 1 and are fixed by the projecting member 600, the upper surface 85 is fitted to the clamping portion 602 while the lower surface 82 is fitted to the earth clip fixing portion 603, thereby mounting the earth clip 80 to the mold frame 1.

Figure 14:
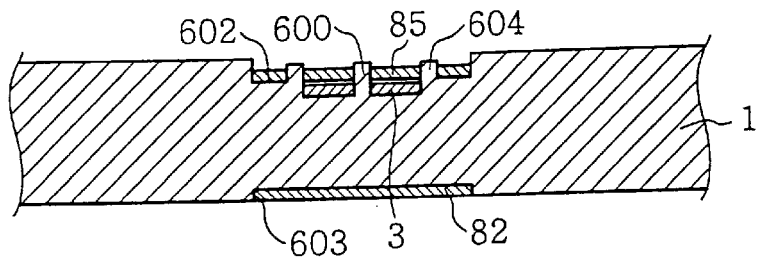
FIG. 14 is a section view showing an assembled configuration of the earth clip and the mold frame of FIG. 13.

The support surface 601 and the upper surface 85 respectively include the clip locking member 604 and the locking aperture 86. As shown in FIG. 14, when the earth clip 80 is mounted to the mold frame 1, a locking aperture 86 engages a respective clip locking member 604. As a result, the earth clip 80 is firmly fixed by each clip locking member 604. Each locking member 604 is projected higher than the thickness of the upper surface 85. Accordingly, the earth clip 80 fixed by each clip locking member 604 is not easily detached by impact.

The earth clip 80 is restricted from pressing downwardly on the sheets 3 by the supporting surface 601. As a result, appropriate level of thermal expansion space can be provided on the whole surface of the sheets 3. Accordingly, the sheets 3 can be prevented from wrinkling which may occur when the sheets 3 are fixed using a fixing member, such as tape. Therefore, display performance of an LCD device incorporating the present invention can be enhanced.

The sheets 3 fixed into the mold frame 1 focus and diffuse the light emitted from the light guide plate 2 and output the same to the LCD panel 4 which then rapidly display information.

As aforementioned, the sheets can be prevented from wrinkling by fixing the sheets to the mold frame using a fixing member such as the positioner and the earth clips according to the present invention without using a fixing member such as tape. Therefore, display performance of an LCD device incorporating the present invention can also be enhanced. The present invention may be applied to any LCDs fabricated through a fabricating line without degradation of the efficiency.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A liquid crystal display (LCD) module comprising:
   a mold frame accommodating a light guide plate, a series of overlying sheets and an LCD panel;
   a lamp disposed in a portion of said mold frame and which emits light to said LCD panel via said light guide plate and sheets;
   a top chassis enclosing said mold frame;
   a printed circuit board having an earth terminal and which is electrically connected to said LCD panel and controls a driving state of said LCD panel; and
   a positioner being erected and inserted between said mold frame and said LCD panel and which fixes said sheets onto said mold frame by perforating said overlying sheets and mold frame which are superposed.

2. The LCD module according to claim 1, wherein said positioner comprises:
   a first head located on an uppermost sheet of said overlying sheets and fixed to an edge portion of said sheets;
   a first pin formed by extending a portion of said first head orthogonally and inserted into said mold frame passing through said overlying sheets; and
   a second pin formed by extending another portion of said first head orthogonally and inserted into said mold frame without passing through said sheets.

3. The LCD module according to claim 2, wherein said overlying sheets comprise:
   a first through hole for insertion of said first pin, which is formed by perforating said overlying sheets at a common portion thereof corresponding to a bottom of said first pin at a time; and
   a first groove for passage of said second pin, which is formed by cutting away said overlying sheets at a common portion thereof corresponding to a bottom of said second pin at a time.

4. The LCD module according to claim 3, wherein said first through hole does not contact said first pin.

5. The LCD module according to claim 4, wherein said first through hole is formed as a slit.

6. The LCD module according to claim 5, wherein said first through hole is disposed in such a manner that its lengthwise direction is in parallel with a sheet expansion direction.

7. The LCD module according to claim 6, wherein said first through hole is disposed in such a manner that its lengthwise direction is in parallel with longer sides of said sheets.

8. The LCD module according to claim 3, wherein said mold frame comprises:
   a first fixing hole for fixation of said first pin, which is formed by perforating said mold frame at a portion thereof corresponding to said first through hole; and
   a second fixing hole for fixation of said second pin, which is formed by perforating said mold frame at a portion thereof corresponding to said first groove.

9. The LCD module according to claim 8, wherein said first and second fixing holes contact said first and second pins.

10. The LCD module according to claim 8, wherein said mold frame further comprises a stopper projecting member for preventing said sheets from being excessively pressed by said first head, said stopper projecting member being formed integrally with said mold frame and around said first fixing hole upwardly to a predetermined height, inserted through said sheets and contacting said first head.

11. The LCD module according to claim 1, wherein said positioner comprises:
   a second head which is located on an uppermost sheet of said overlying sheets and fixed to an edge portion of said sheets;
   a third pin which is formed by extending a portion of said second head orthogonally and inserted into said mold frame passing through said sheets; and
   a locking member which is formed integrally with said third pin and projected from an end portion of said third pin.

12. The LCD module according to claim 11, wherein said overlying sheets include a second through hole for insertion of said third pin, which is formed by perforating said overlying sheets at a common portion thereof corresponding to a bottom of said third pin at a time.

13. The LCD module according to claim 12, wherein said second through hole does not contact said third pin.

14. The LCD module according to claim 13, wherein said second through hole is formed as a slit.

15. The LCD module according to claim 14, wherein said second through hole is disposed in such a manner that its lengthwise direction is in parallel with a sheet expansion direction.

16. The LCD module according to claim 15, wherein said second through hole is disposed in such a manner that its lengthwise direction is in parallel with longer sides of said sheets.

17. The LCD module according to claim 12, wherein said mold frame comprises a third fixing hole for fixation of said third pin, which is formed by perforating said mold frame at a portion thereof corresponding to said second through hole.

18. The LCD module according to claim 17, wherein said third fixing hole contacts said third pin.

19. The LCD module according to claim 11, wherein said mold frame further comprises at a bottom thereof a deviation preventive groove communicated to said sheets and which prevents deviation of said locking member.

20. The LCD module according to claim 11, wherein said locking member has an inverse triangular cross section.

21. The LCD module according to claim 1, wherein said positioner further comprises:
   a third head which is located on an uppermost sheet of said overlying sheets and fixed to an edge portion of said sheets; and
   a pair of fourth pins which are formed by extending respective portions of said third head and respectively inserted into said mold frame without passing through said sheets.

22. The LCD module according to claim 21, wherein said overlying sheets comprises:
   a third through hole formed by perforating said overlying sheets at a portion thereof between two portions corresponding to said fourth pins; and
   a pair of second grooves for passage of said fourth pins, which are formed by cutting away at a time said overlying sheets at respective common portions thereof corresponding to bottoms of said pair of fourth pins.

23. The LCD module according to claim 22, wherein said mold frame comprises a pair of fourth fixing holes for fixation of said fourth pins, which are formed by perforating said mold frame at a portion thereof corresponding to said second grooves.

24. The LCD module according to claim 23, wherein said fourth fixing hole contacts said fourth pins.

25. The LCD module according to claim 23, wherein said mold frame further comprises a projecting member for preventing said sheets from being excessively pressed by said third head, said projecting member being formed integrally with said mold frame at a portion thereof corresponding to said third through hole upwardly to a predetermined height, inserted through said sheets and contacting said third head.

26. The LCD module according to claim 25, wherein said projecting member does not contact said third through hole.

27. The LCD module according to claim 26, wherein said third through hole is formed as a slit.

28. The LCD module according to claim 27, wherein said third through hole is disposed in such a manner that its lengthwise direction is in parallel with a sheet expansion direction.

29. The LCD module according to claim 28, wherein said third through hole is disposed in such a manner that its lengthwise direction is in parallel with longer sides of said sheets.

30. The LCD module according to claim 1, wherein said positioner further comprises:
   a fourth head which is located on an uppermost sheet of said overlying sheets and fixed to an edge portion of said sheets;
   a fifth pin which is formed by extending a portion of said fourth head orthogonally and inserted into said mold frame passing through said sheets; and
   a pair of sixth pins which are formed by extending portions of said fourth head orthogonally and inserted into said mold frame without passing through said sheets.

31. The LCD module according to claim 30, wherein said overlying sheets comprises:
   a fourth through hole for insertion of said fifth pin, which is formed by perforating said overlying sheets at a common portion thereof corresponding to a bottom of said fifth pin at a time; and
   a pair of third grooves for passage of said sixth pins, which are formed by cutting away said overlying sheets at respective common portions thereof corresponding to bottoms of said pair of sixth pins.

32. The LCD module according to claim 31, wherein said fourth through hole does not contact said fifth pin.

33. The LCD module according to claim 32, wherein said fourth through hole is formed as a slit.

34. The LCD module according to claim 33, wherein said fourth through hole is disposed in such a manner that its lengthwise direction is in parallel with a sheet expansion direction.

35. The LCD module according to claim 34, wherein said fourth through hole is disposed in such a manner that its lengthwise direction is in parallel with longer sides of said sheets.

36. The LCD module according to claim 31, wherein said mold frame comprises:
   a fifth fixing hole for fixation of said fifth pin, which is formed in said mold frame at a portion thereof corresponding to said fourth through holes; and
   a pair of sixth fixing holes for fixation of said sixth pins, which are formed in said mold frame at portions respectively corresponding to said pair of third grooves.

37. The LCD module according to claim 36, wherein said fifth and sixth fixing holes contact said fourth and fifth pins.

38. A liquid crystal display (LCD) module comprising:
   a mold frame accommodating a light guide plate, a series of overlying sheets and an LCD panel;
   a lamp disposed at a portion of said mold frame and which emits light to said LCD panel via said light guide plate and said overlying sheets;
   a top chassis enclosing said mold frame;
   a printed circuit board (PCB) provided with an earth terminal and which is electrically connected to said LCD panel and controls a driving state of said LCD panel; and
   an earth clip fitted to an end portion of said mold frame and which discharges via said top chassis an electronic wave generated from said PCB by electrically connecting said earth terminal of said PCB and said top chassis and restricts movement area of said overlying sheets so that said sheets are not moved by external force.

39. The LCD module according to claim 38, wherein said earth clip is angular C shaped, has an upper, a side, and a lower surface, and is mounted onto said mold frame in a fashion that said side surface faces toward that of said mold frame and said lower surface contacts said earth terminal of said PCB, and said upper surface further includes a reversed L-shaped member to be placed over said sheets so as to restrict movement area of said sheets.

40. The LCD module according to claim 39, wherein said mold frame further comprises a clamping portion for exposing end portions of said sheets, which is formed at a portion corresponding to said upper surface of said earth clip.

41. The LCD module according to claim 40, wherein said clamping portion further comprises a support projecting member for supporting said upper surface of said earth clip and which is projected to a predetermined height.

42. The LCD module according to claim 41, wherein said support projecting member has a semicircular cross section.

43. The LCD module according to claim 38, wherein said earth clip is angular C shaped, has an upper, a side, and a lower surface, and is mounted onto said mold frame in a fashion that said side surface faces toward that of said mold frame and said upper surface is placed over said sheets so as to restrict movement area of said sheets, and an end portion of said lower surface is extended along an edge of said mold frame so as to contact said earth terminal of said PCB.

44. The LCD module according to claim 43, wherein said mold frame further comprises a clamping portion for exposing end portions of said sheets, which is formed at a portion thereof corresponding to said upper surface of said earth clip.

45. The LCD module according to claim 44, wherein said clamping portion further comprises a projecting member for fixing said sheets and which is projected from said mold frame.

46. The LCD module according to claim 45, wherein said sheets further comprise a sheet through hole for insertion of said projecting member, which is formed at a portion thereof corresponding to said projecting member.

47. The LCD module according to claim 46, wherein said sheet through hole does not contact said projecting member.

48. The LCD module according to claim 47, wherein said sheet through hole is formed as a slit.

49. The LCD module according to claim 48, wherein said sheet through hole is disposed in such a manner that its lengthwise direction is in parallel with a sheet expansion direction.

50. The LCD module according to claim 49, wherein said sheet through hole is disposed in such a manner that its lengthwise direction is in parallel with longer sides of said sheets.

51. The LCD module according to claim 44, wherein said clamping portion further comprises a pair of supporting surface members formed at both portions opposing from said projecting member, as being projected from said mold frame, and support said upper surface of said earth clip, and prevent said sheets from being overly pressed by said upper surface of said earth clip.

52. The LCD module according to claim 51, wherein said supporting surface members further comprises a clip locking member for locking said upper surface of said earth clip.

53. The LCD module according to claim 52, wherein said upper surface of said earth clip further comprises a locking aperture for insertion of said clip locking member, which is formed at a portion corresponding to said clip locking member.

54. A liquid crystal display (LCD) module comprising:
  a housing, comprising:
    a frame; and
    a chassis that encloses the frame;
  an LCD panel disposed within the housing;
  a printed circuit board (PCB) electrically connected to the LCD panel, wherein the PCB includes a ground connection;
  a light source disposed within the housing;
  a light guide plate disposed within the housing between the LCD panel and the light source, wherein the light guide plate is configured to distribute light from the light source to the LCD panel;
  a plurality of sheets disposed within the housing between the light guide plate and the LCD panel; and
  means for securing the plurality of sheets to the frame such that the plurality of sheets can thermally expand and contract along at least one direction.

55. An LCD module according to claim 54 wherein an aperture is formed through a portion of the plurality of sheets, and wherein the securing means comprises:

a first bore formed within a portion of the frame; and
  a fastener, comprising:
    a base; and
    a first pin extending outwardly from the base, wherein the first pin is configured to pass through the aperture without contacting the plurality of sheets and to be received within the first bore so as to maintain the base in non-contacting, adjacent relationship with the plurality of sheets.

56. An LCD module according to claim 55 wherein the frame comprises a second bore formed therein adjacent the first bore, and wherein the fastener further comprises a second pin extending outwardly from the base that is configured to be received within the second bore so as to maintain the base in non-contacting, adjacent relationship with the plurality of sheets.

57. An LCD module according to claim 54 wherein an aperture is formed through a portion of the plurality of sheets and wherein the securing means comprises:
  a pair of first and second bores adjacently formed within a portion of the frame;
  a post positioned between the first and second bores that extends outwardly from the frame, wherein the post is configured to pass through the aperture in the plurality of sheets without contacting the plurality of sheets; and
  a fastener, comprising:
    a base;
    a pair of first and second pins extending outwardly from the base that are configured to be received within the first and second bores, respectively, so as to maintain the base in non-contacting, adjacent relationship with the plurality of sheets.

58. An LCD module according to claim 54 further comprising means for electrically connecting the ground connection to the chassis.

59. An LCD module according to claim 58 wherein the securing means comprises a conductive member that is mounted on the frame and that electrically connects the ground connection to the chassis.

60. An LCD module according to claim 54 wherein the aperture formed through a portion of the plurality of sheets is elongated along a direction substantially parallel with a direction of thermal expansion and contraction of the plurality of sheets.

61. A liquid crystal display (LCD) module comprising:
  a housing, comprising:
    a frame having a recessed portion and a post extending outwardly from the recessed portion; and
    a chassis that encloses the frame; an LCD panel disposed within the housing;
  a printed circuit board (PCB) electrically connected to the LCD panel, wherein the PCB includes a ground connection;
  a light source disposed within the housing;
  a light guide plate disposed within the housing between the LCD panel and the light source, wherein the light guide plate is configured to distribute light from the light source to the LCD panel;
  a plurality of sheets disposed within the housing between the light guide plate and the LCD panel, wherein an aperture is formed through a portion of the plurality of sheets and wherein the post extending from the frame is engaged with the aperture without contacting the plurality of sheets such that the plurality of sheets can thermally expand and contract along at least one direction; and a member mounted on the frame in non-contacting, adjacent relationship with the plurality of sheets, wherein the member prevents the post from becoming disengaged from the aperture, and wherein the member electrically connects the ground connection to the chassis.

62. An LCD module according to claim 61 wherein the member comprises a slot formed therein that is configured to engage the post.

63. An LCD module according to claim 61 wherein the aperture formed through a portion of the plurality of sheets is elongated along a direction substantially parallel with a direction of thermal expansion and contraction of the plurality of sheets.

* * * * *

UNITED STATES PATENT AND TRADEMARK OFFICE
CERTIFICATE OF CORRECTION

PATENT NO. : 6,175,396 B1  
DATED : January 16, 2001  
INVENTOR(S) : Kim et al.

Page 1 of 1

It is certified that error appears in the above-identified patent and that said Letters Patent is hereby corrected as shown below:

<u>Title page,</u>  
Item [75], line 2, inventor "Lee" should appear as follows:  
-- Sang-hwan Lee --

Signed and Sealed this

Twenty-first Day of May, 2002

Attest:

Attesting Officer

JAMES E. ROGAN  
*Director of the United States Patent and Trademark Office*